G. Adams, Jr.
Scaffold
Nº 89,840.   Patented May 11, 1869.
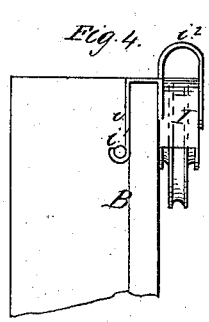
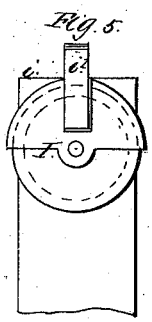
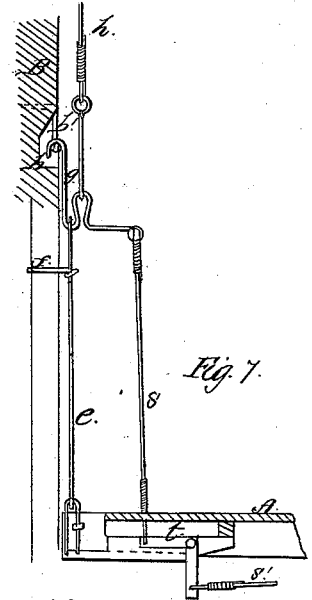
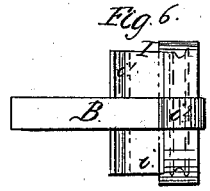
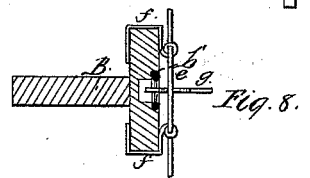
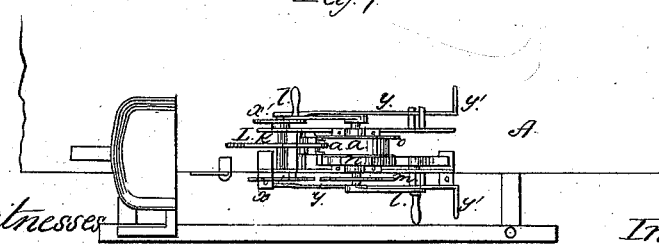

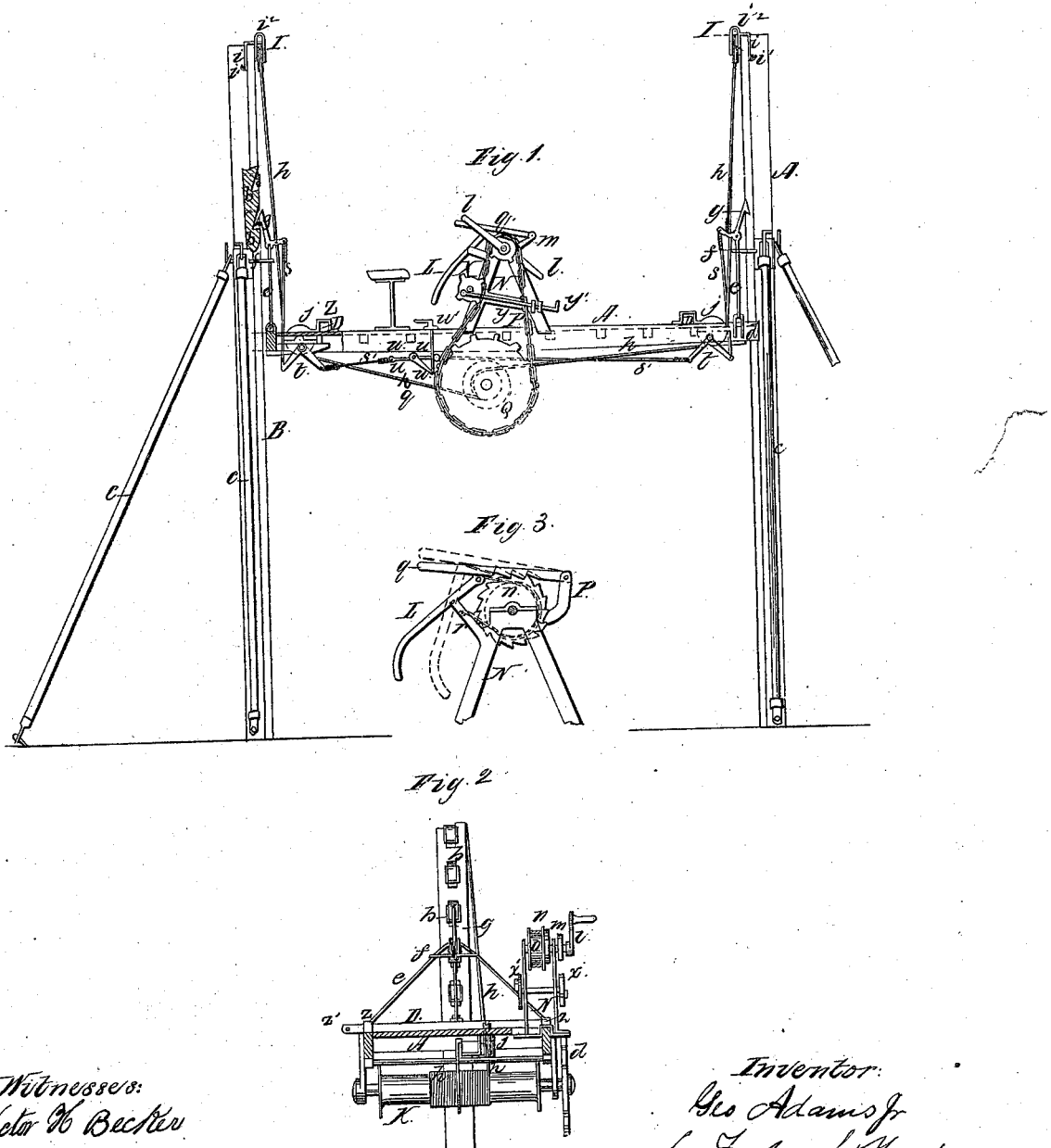

United States Patent Office.

GEORGE ADAMS, JR., OF ALEXANDER, NEW YORK.

Letters Patent No. 89,840, dated May 11, 1869.

---

IMPROVED SCAFFOLD.

---

The Schedule referred to in these Letters Patent and making part of the same.

---

*To all whom it may concern:*

Be it known that I, GEORGE ADAMS, Jr., of Alexander, in the county of Genesee, and State of New York, have invented certain new and useful Improvements in Scaffolds; and I do hereby declare that the following is a full and exact description thereof, reference being had to the accompanying drawings, making part of this specification.

My improvements relate to a scaffold designed more especially for builders' use, which is raised or lowered by the workmen thereon.

In the drawings—

Figure I is a side elevation of my improved apparatus.

Figure II is a vertical cross-section, with some of the parts removed.

Figure III is a view of the brake-lever, pawl, and ratchet-wheel detached.

Figures IV, V, and VI, are an enlarged edge view, a side view, and plan of the hoisting-pulley at top of the standards.

Figures VII and VIII are enlarged sectional detached views, showing the pawl-hook, its connections, and a cross-section of one of the standards.

Figure IX is a plan of the brake and hoisting-gearing.

Like letters refer to like parts in each of the figures.

A is the platform, forming the scaffold; B B, two guide-supporting standards, one at each end of the platform, provided with suitable braces, $c$ $c$, to maintain them in their proper vertical position.

These standards are preferably made of T-form, as shown in Fig. VIII, and are connected to the ends of the platform by irons, $d$, which overlap the edges of the standards, as shown in Fig. I, but leave the platform free to slide up and down the same.

$e$ is a bail at each end of the platform, having wings or guide-irons, $f$, Fig. VIII, near its upper end, which overlap the edges of the standards similar to the irons $d$, and serve to steady the platform.

These bails connect at their upper ends with hooks or pawls, $g$, as most clearly shown in Fig. VII.

To these hooks, also, attach the hoisting-ropes $h$, which pass around pulleys I at the top of the standards, and thence downward through the platform and around a pulley, $j$, to a windlass, K, Fig. II, arranged underneath the same.

The standards B, on their inner face, are formed with recesses or ratchets, $b$, in which the hooks $g$ engage in supporting the platform.

These recesses or shoulders may be provided with staples, $b'$, in which the hooks engage, if required.

At one edge of the platform, mounted at the top of suitable standards, N, is a crank-shaft, $k$, provided with a winch, $l$, at each end, and having mounted thereon a chain-pinion, $m$, a ratchet-wheel, $n$, and friction or brake-wheel $o$.

From the pinion $m$ a chain, $p$, descends around a similarly-toothed wheel, Q, mounted on the end of the windlass or axis, K, beneath the platform.

L is the brake-lever, having its fulcrum in the ends of two arms, $r$, from the standard N.

A brake-strap, $a$, of leather, or other suitable material, is attached to a cross-rod, connecting the arms $r$, and passes around and over the wheel $o$, and attaches to the end of lever L.

To an arm, P, extending from the opposite side of the standard N, is hinged the end of a pawl, $q$, formed with one or more teeth to engage with the ratchets of the wheel $n$.

The end of this pawl rests on a pin at the upper end of the brake-lever, and keeps the brake from pressing the wheel.

The brake is applied to the wheel $o$ by depressing the brake-lever, the end of which also serves to raise and disengage the pawl from the ratchet-wheel.

A rope, $s$, attaches to the ends of each of the pawl-hooks $g$, from whence it descends through the platform and connects with one end of the angle-lever $t$.

From the other arms of these levers, ropes $s'$ connect with two arms, $u$, attached to a rock-shaft, $v$.

At one end of this rock-shaft is an arm, $w$, from the end of which a pull-rod, $w'$, passes up through the platform, where it is provided with a suitable handle for operating it, as shown in Fig. I.

If desired, a small chain and crank-wheel, $x$, and crank-wheel $x'$ may be arranged intermediate the two wheels $m$ Q, on the same shaft, the wheel $x$ engaging with the chain $p$.

These wheels $x$ $x'$ have each a pitman, $y$, attached thereto, the free ends of which reciprocate in suitable guides, and are provided with foot-rests $y'$, so as to be operated by the feet, while the hands operate the winches $l$.

The pulley-blocks I are constructed with hooks $i$ $i$, which fit over the ends of the standards, as shown in Figs. IV and VI, being retained in place by pins $i'$ passing through the standards, as clearly shown.

These blocks are also provided with an eye, $i^2$, for suspending it from the top of the building, when the standards are dispensed with, as will hereafter be explained.

The operation of my improved apparatus, constructed as before described, is as follows:

The platform and standards A B being connected and arranged at the place required, and the latter properly braced, the workmen mount the platform, which rests on the ground, and by turning the cranks $l$, (the foot-device being operated or not, as desired,) the ropes $h$ are wound upon the windlass K, which elevates the platform.

The connection of the hoisting-rope with the hooks $g$ is such as that strain on the rope in raising the platform tends to press the hooks against the ratchets in the standards, over which they slide as the platform ascends, but which engage with the same when the motion ceases, and securely retain the platform in place, the pawl $q$ also engaging with the ratchet-wheel $n$, forming a double fastening.

When the platform is required to be lowered, it is first slightly elevated, so as to disconnect the hooks $g$. Then, by pulling on the rod, the hooks $g$ are drawn away from contact with the ratchets of the standards, the pawl $q$ preventing the descent of the platform.

By applying the brake L $a$, as before described, the pawl $q$ is disengaged, and the platform easily and gradually lowered to the required point, when, by releasing the pull-rod, the hooks $g$ again engage with the standards, and the pawl $q$ with the ratchet-wheel $n$.

For elevating the scaffold to the top of high buildings, the standards may be dispensed with, the pulley-blocks I being fastened to the top of the building, where the scaffold is elevated and lowered, as before described, (the hook-disconnecting device not being required,) and retained at any point by the pawl $q$ and ratchet-wheel $n$.

In such case I employ adjustable guard-arms D D, arranged and secured transversely of the platform by guides $z$, with friction-rollers $z'$, at their ends, which may be adjusted, so as to project a greater or less distance from the edge of the platform.

These arms serve to keep the platform away from contact with the side of the building, the friction-wheels traversing up and down the same as the scaffold is raised and lowered.

The standards B, when they are used, perform this function, and render the use of such guard-arms unnecessary.

In transporting the scaffold, the standards B may be disconnected from the platform, so that the whole apparatus can be folded compactly together.

The advantages of my improvements for painters' use, as well as for builders generally, and also for other purposes, where a scaffold is required, are obvious, ladders, and the labor and expense of material for building, and adjusting the height of the scaffold, being avoided.

What I claim as my invention, and desire to secure by Letters Patent, is—

1. The standards B, platform A, bails $e$, pawl-hooks $g$, ratchets $b$, and hoisting-cable $h$, when arranged and combined to operate substantially as herein set forth.

2. The crank $l$ and chain-pinion $m$, supported above the platform, in combination with the windlass K and chain-wheel Q, below the platform and the connecting chain, guide-pulleys $j$, and cable $h$, arranged to operate as and for the purpose described.

3. The arrangement of the crank and chain-wheels $x$ and $x'$, pitmen $y$ $y$, and foot-rests $y'$ $y'$, as described.

4. The combination and arrangement of the brake-lever and strap L $a$, with pawl and ratchet-wheels $q$ $n$, as and for the purpose specified.

5. The combination of the ropes $s$, angle-levers $t$, rope $s'$, arms $u$ $w$, and pull-rod $w'$, with the hook-pawls $g$, for disengaging the latter, as set forth 6. The combination and arrangement of the ratchet-standards B, braces $c$, and pulleys I, with the platform A, supporting-pawl hooks $g$, and hoisting-rope $h$, substantially as and for the purpose set forth.

7. The pulley I, provided with hooks $i$ and eye $i^1$, constructed in the manner and for the purpose described.

8. The adjustable guard-arms D, provided with friction-rollers $z'$, arranged and operating as set forth.

GEO. ADAMS, JR.

Witnesses:
JAY HYATT,
JNO. J. BONNER.